Patented Aug. 3, 1937

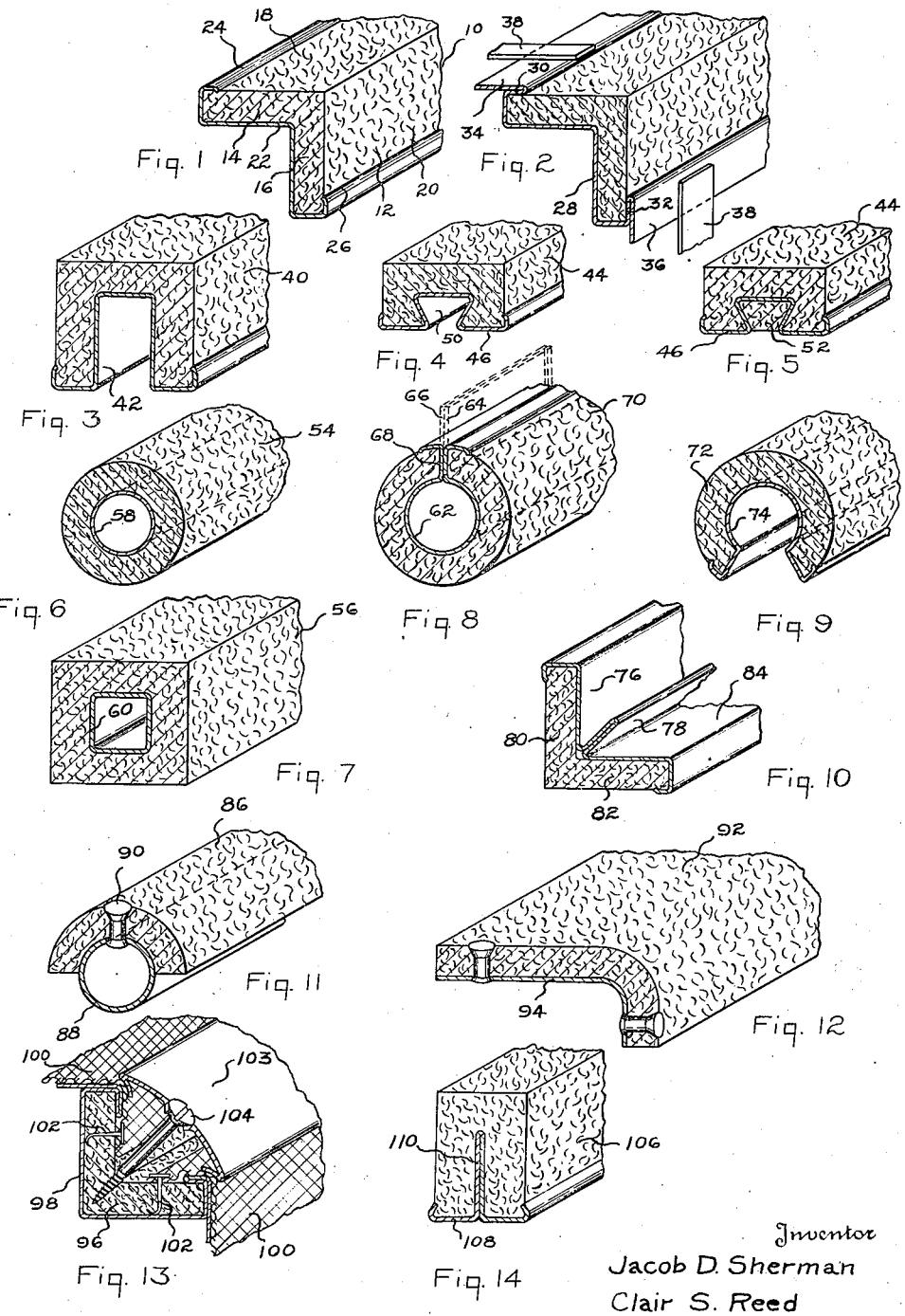

2,089,005

UNITED STATES PATENT OFFICE 2,089,005

COMPOSITE STRUCTURAL MEMBER

Jacob D. Sherman, Clair S. Reed, and Otis C. Currie, Jackson, Mich., assignors to Reynolds Spring Company, Jackson, Mich., a corporation of Delaware Application February 24, 1936, Serial No. 65,404

3 Claims. (Cl. 20—74)

The present invention relates to improvements in composite structural members preferably of sheet metal and fibrous strip.

An object of this invention is to provide strong, light one-piece structural members for general use as framework elements and the like in which a surface or surfaces are desired to receive fastening instrumentalities such as tacks, nails, screws, and the like.

Another object is to provide composite metal and fibre structural members of a design in which the exposed nailing and tacking areas have been materially increased over prior structures.

A further object is to provide an improved composite metal and fibrous structural member of a design in which the sheet metal constitutes in general a reinforcing interior structure for the fibrous exterior.

The uses of the present invention are unrestricted in scope and generally may be described as those to which wooden structural members have heretofore found application. One particular field of application is that of upholstered structures in which a tacking surface is required. This would include vehicle seats and bodies, furniture, box springs, etc. Other uses of the invention are found in the field of metallic building structure in which nailing surfaces for applying the exterior and interior structure, and the like, is desirable. The invention also has application to the fabrication of frameworks of all descriptions in which strength and lightness of construction is desired and a tacking or nailing surface may or may not be required.

Heretofore, as appears from the patented art, composite structural members have been proposed of metal and wood or fibre of widely varied cross-section in the furniture, vehicle, and building fields. Where wood has been used for the most part the same has been glued or bolted to the metal structure or encased in the metal to protect or increase the rigidity of the already relatively rigid wooden structure. Composite structures of sheet metal and fibre, such as twisted and laminated paper, are also known but their uses have been primarily limited to cushion spring frame structure and have not been of a design permitting more than a limited field of application.

The present invention contemplates a composite metal and fibrous structural member which is fabricated in continuous or cut lengths by rolling together a strip of sheet metal and a fibrous strip of twisted paper or the like. Preferably the fibrous strip is preformed and sufficiently flexible to be handled from a coil or spool during the rolling operation if the cross-section of the strip permits and if not it is fed into the rolling machine in cut lengths. After the composite structural member has been rolled and preferably fabricated into its final form the fibrous strip, which normally contains about 12% moisture, will dry out and become relatively hard and rigid. The important feature of the invention resides in the design of the rolled composite members in that a decided structural departure has been made from the metal encased wooden and fibrous tacking or nailing strip and in lieu thereof the metal became in general a reinforcing interior structure thus greatly increasing the exposed surface of the fibre over prior practices. As a result the utility and field of application of the composite structure member has been materially enhanced.

In the drawing where several embodiments of the invention are illustrated:

Figs. 1 to 14 inclusive are broken oblique projections of several embodiments of the invention, the composite metal and fibrous members being shown in section.

Referring to the drawing in Fig. 1 the structural member 10 comprises a fibrous strip 12 having sections 14 and 16 disposed at right angles to each other to provide exposed surfaces 18 and 20 to receive fastening instrumentalities such as nails, tacks, screws, etc. The strip 12 is preferably of preformed paper or other fibrous stock and may be twisted, compressed, laminated or otherwise suitably constructed. The moisture content of the fibrous strip is sufficiently high during the rolling operation of the reinforcing sheet metal strip 22 to assure adequate pliability of the fibrous strip to enable the rolling of the longitudinal edges 24 and 26 of the metal strip 22 into the strip 12 and to prevent breakage due to brittleness. With the strip 12 in this pliable condition the composite structural member 10 more easily shaped to a desired form than after the fibrous strip has dried out to become hard and more rigid.

As the section of the fibrous strip 12 will prevent the same from being handled from off a roll, in most cases, cut lengths of the strip 12 may be fed into the rolling machine together with the metal strip 22 and the latter rolled to conform with the contour of the under side of the strip 12 and embrace the edges thereof. In this manner the metal strip 22 constitutes a reinforcement for the interior surface of the fibre strip 12.

The modification shown in Fig. 2 differs from the structural member of Fig. 1 in that the edges of the metal strip 28 after forming flanges 30 and 32 are return bent to provide projecting flanges 34 and 36 to which other structural members such as bars 38 may be welded, riveted or otherwise secured. In this respect the member shown in Fig. 2 among other uses may be employed in the manner of the flanged composite metal and fibrous member disclosed in application Serial No. 53,537, filed December 9, 1935. Both the structural members shown in Figs. 1 and 2 have the advantage over that shown in the aforesaid application in that upon upholstering the framework the tacking surface is more available as there is more exposed surface. It should also be apparent that the flanges 34 and 36 may be welded or riveted to supporting structure to provide a nailing or tacking surface at a corner, joint, edge, or the like, of a metallic framework.

Another form of the invention is shown in Fig. 3 in which the fibrous strip 40 is of inverted U-shape providing exposed surfaces from three different sides. The metal strip 42 is rolled to conform to the interior walls of the strip 40 and the edges of the strip 42 embrace the ends of the parallel sections of the strip 40 and secure the parts together in the manner of the previously described composite member.

A slightly modified form of the last described form of the invention is shown in Fig. 4 in which a dove tail joint is provided between the fibrous strip 44 and metal strip 46 as at 48. This construction has the advantage that the fibrous strip and metal strip are more firmly secured together and that the dove tail opening 50 may be used as an anchorage for the support of the composite structural member. In Fig. 5 the dove tail opening is shown receiving a fibrous strip 52 thus provision being made for a nailing or tacking surface on all four sides of the structural element.

A form of the invention is shown in Figs. 6 and 7 in which the entire outer surfaces of the fibrous strips 54 and 56, respectively, are exposed. These strips are tubular and receive tubular metal strips 58 and 60, respectively. Preferably the tubular fibrous strips are preformed and the metal strips welded to form, inserted, and if desired, may be expanded in place. Obviously the elements of the composite structure may take innumerable shapes and forms from those shown. In Fig. 8 a further modification is illustrated in which the central portion metal strip 62 is first rolled into a tube with the longitudinal edges 64 and 66 disposed in radial parallelism. The tube may then be welded or otherwise fastened along a longitudinal line as at 68 and the free edges rolled over in opposite directions upon the split cylindrical fibrous strip body 70 to receive the same upon the tubular central part of the strip 62. A modification of the structure of Fig. 8 is shown in Fig. 9 in which the fibrous strip 72 is semi-cylindrical and is interiorly reinforced by the rolled metal strip 74. The forms of the invention shown in Figs. 6 to 9, inclusive are all characterized by the fact that maximum exposed fibrous surfaces is available for tacking and nailing purposes and the section of the metal strip is such as to give maximum strength and rigidity.

Fig. 10 illustrates a further form of the invention which is similar to that shown in Fig. 1 except the metal strip 76 is rolled to provide a double walled flange 78. This flange may serve the same function as the flange 38 of Fig. 2.

To enumerate a specific use of the structural member shown in Fig. 10, it is suitable as the bottom frame of cushion seat construction in vehicles and furniture. The upholstery can be tacked to either or both the surfaces 80 and 82 while the flange 78 may be crimped over the coil of springs supported upon the surface 84.

In lieu of securing the fibrous metallic parts together by rolling one upon the other, the fibrous strips may be interiorly reinforced by riveting the two parts together as shown in Figs. 11 and 12. Fig. 11 shows a semi-cylindrical fibrous strip 86 secured in position by a tubular metal strip 88 by a rivet 90 while in Fig. 12 a right angle fibrous strip 92 is similarly secured to a metal strip 94.

Referring to Fig. 13, a reversal of the relation of the fibre strip 96 and metal strip 98 from that of Fig. 2, is shown; upholstery 100 being illustrated as secured to the strip 96 by tacks 102. A sheet metal molding 103 is removably held in position by screws 104 to finish the appearance of the corner.

An exceedingly light yet rigid member is shown in Fig. 14 in which the greater portion of the surface of the fibrous strip 106 is exposed for nailing and tacking purposes and the like. The sheet metal strip 108 has been rolled to provide a stiffening rib 110 extending inwardly from one edge of the fibrous strip 106 into the central part thereof.

The essence of the present invention is considered to reside in a composite structural member of metal and fibrous material, preferably without grain, although the use of wood is not exclusive from the scope of the invention, in which the fibrous material in general makes up the exterior surface and is in general internally reinforced by the metal. A considerable number of embodiments of the invention have been illustrated for a more clear understanding of the invention and appreciation of its flexibility of design as to shape and form.

Having described our invention what we claim as new and desire to protect by Letters Patent is:

1. A composite structural member of the class described comprising a fibrous strip having integral sections thereof disposed at substantially 90° to each other, the outer adjacent surfaces of said sections constituting an exposed exterior in two different planes, a sheet metal strip conforming to the inner surface of said sections to constitute a reinforcing interior, and means securing said strips permanently together.

2. A composite structural member of the class described comprising an elongated fibrous strip of uniform shape and cross-section, said strip having angularly disposed sections defining outer faces, inner faces, and longitudinal edges, an elongated strip of sheet metal of uniform shape and cross-section secured to the inner faces of said fibrous strip in laminated relation to provide an interior reinforcement for said fibrous strip, at least the major area of said outer faces being exposed and adapted to receive fastening instrumentalities on the different sides of said fibrous strip.

3. A composite structural member as defined in claim 2 wherein the longitudinal edges of said metal strip embrace said longitudinal edges of said fibrous strip.

JACOB D. SHERMAN.
OTIS C. CURRIE.
CLAIR S. REED.